United States Patent
Botosan et al.

[11] Patent Number: 6,142,037
[45] Date of Patent: Nov. 7, 2000

[54] TRANSMISSION CHECK VALVE

[75] Inventors: Valentin Botosan, Rochester; Berthold Martin, Shelby Township, both of Mich.

[73] Assignee: DaimlerChrysler Corporation, Auburn Hills, Mich.

[21] Appl. No.: 09/338,896

[22] Filed: Jun. 23, 1999

[51] Int. Cl.[7] .............................. F16H 57/02; F16K 15/06
[52] U.S. Cl. .................................... 74/606 R; 137/543.13
[58] Field of Search ............................ 74/606 R, 606 A; 137/542, 543, 543.13, 543.17

[56] References Cited

U.S. PATENT DOCUMENTS

| | | | |
|---|---|---|---|
| 469,853 | 3/1892 | Gibson | 137/543.13 X |
| 1,183,981 | 5/1916 | Johnson | 137/543.13 |
| 2,879,794 | 3/1959 | Costello | 137/543.13 X |
| 4,437,492 | 3/1984 | Taylor | 137/543.13 |
| 4,982,826 | 1/1991 | Holbrook | 192/106 F |

*Primary Examiner*—Mary Ann Green
*Attorney, Agent, or Firm*—Kenneth H. Maclean

[57] ABSTRACT

A check valve which fits within a multi-diametered shouldered cavity formed within a pump valve body of a transmission. The check valve assembly has a movable valve element with a head to seal an annular aperture in a separator plate of the transmission. The valve element further has a stem axially extending into the cavity. The stem has an enlarged annular end. A base retainer has a spline formation in a central opening which allows the enlarged annular end of the stem to be inserted therein. After relative rotation between the base retainer and the stem of the valve element, the valve element is captured to the base retainer. A spring is captured between the stem of the valve element and the base retainer to bias the head of the valve element against the aperture provided in the transmission separator plate.

9 Claims, 2 Drawing Sheets

TRANSMISSION CHECK VALVE

FIELD OF THE INVENTION

The field of the present invention is that of check valves for transmissions. More specifically, the present invention relates to a check valve which relieves the line pressure which is modulated by the transmission pressure regulator valve and allows the line pressure which is modulated by the pressure regulator valve to be relieved if it rises beyond a predetermined value.

DESCRIPTION OF PRIOR DEVELOPMENTS

Automotive vehicles typically have a wheeled frame which mounts an engine. The engine is coupled to a transmission and power train which is torsionally connected with the wheels. Engine torque and speed are converted in the transmission in accordance with the tractive-power demand of the vehicle. A conventional transmission includes a hydromatic torque convertor to transfer engine torque from the engine crankshaft to a rotatable input member of the transmission through fluid-flow forces. The transmission then uses hydraulic pressure to automatically select the proper gears for the torque and speed requirements of the vehicle. To provide the required hydraulic line pressure, there is provided in the transmission a hydraulic pump.

Hydraulic line pressure can often be approximately 300 lbs. psi. To modulate the line pressure, there is provided a line pressure regulation valve. Upon a malfunction of the line pressure regulation valve, the line pressure may elevate to an undesirable pressure. Excessive line pressure may damage the transmission. To protect the transmission from damage due to excessive line pressure, there is provided a line pressure relief valve.

Prior to the present invention most line pressure relief valves were provided by a ball valve that was mated against a seat in a separator plate which was juxtaposed between the transmission pump housing and the valve body housing. When the line pressure exceeded a predetermined value the line pressure would push against the spring biased ball valve to allow fluid to escape to the transmission sump. Although prior embodiments of the ball valve function satisfactorily, it was found to be desirable to cause the ball valve to be provided in a smaller space envelope due to manufacturing and other packaging considerations.

SUMMARY OF THE INVENTION

To meet the above-noted desire the revelation of the present invention is brought forth. In a preferred embodiment the present invention provides a check valve assembly which is mounted into an elongated multi-diametered and shouldered cavity formed within the pump valve body of a transmission housing. The check valve assembly has a movable valve element with a hemispherical head which is configured to sealably interact with an annular aperture in the transmission separator plate when the valve element is in its closed operative mode. The valve element further has a stem axially extending into the cavity and away from the aperture edge. The stem has an outwardly enlarged annular end. A base retainer is abuttedly seated within a shoulder of the cavity provided for the movable valve element. The base retainer has an axially extended central opening which permits full passage of the stem of the movable valve element. The central opening of the base retainer has an inwardly extending spline formation. The enlarged annular end configuration of the movable valve stem has axially extending keyways allowing full passage of the enlarged annular end of the valve element through the central opening. The enlarged annular end configuration of the valve element stem has axially extending keyways formed only partially therethrough, permitting alignment with the splines of the base retainer to capture the valve element and base retainer together in an axial direction. A coil spring is captured between the base retainer and the valve element head to urge the valve element head against the annular edge of the aperture.

It is an object of the present invention to provide a check valve for a transmission. It is an object of the present invention to provide a check valve for a transmission which can be accommodated in a very small space envelope. The above noted object and other advantages of the present inventive transmission check valve will become more apparent to those skilled in the art as the invention is further explained in the accompanying drawings and detailed description.

DETAILED DESCRIPTION OF THE PREFERRED EMBODIMENT

Figure 1:
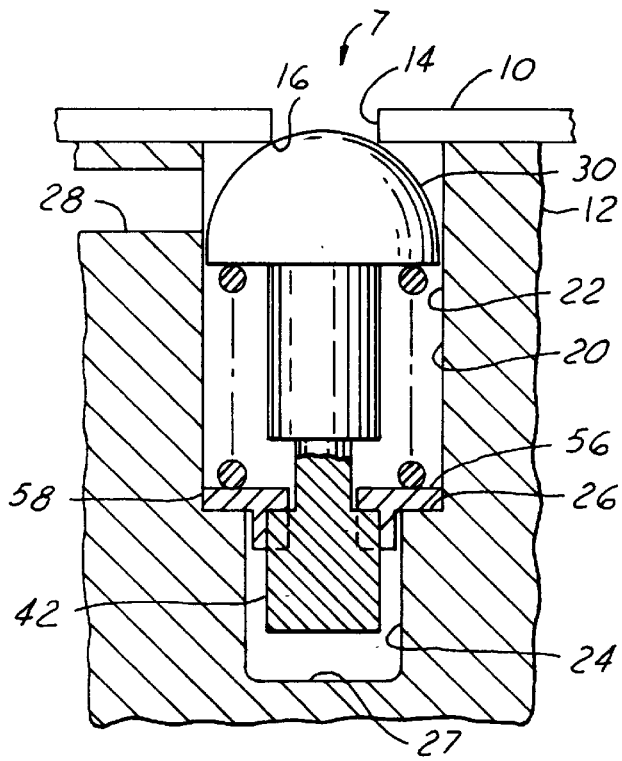
FIG. 1 is a sectional view of a preferred embodiment transmission check valve assembly according to the present invention mounted within a multi-diametered and shouldered cavity provided in a pump housing of a transmission, the check valve assembly is sealing an annular aperture provided within a separator plate of the same transmission.

Referring to FIGS. 1–5, the check valve assembly 7 of the present invention is shown in the environment of an automatic transmission. The automatic transmission has a separator plate 10. The separator plate 10 is juxtaposed between the pump housing (not shown) and the pump valve body 12. The separator plate 10 has an aperture 14 with an annular edge portion 16 as shown in FIG. 1. Above the separator plate 10 is a control volume which is exposed to the line pressure of the transmission. Typical line pressures run about 300 psi.

The valve body housing 12 has an elongated cavity 20. The cavity 20 is multi-diametered with a first large diameter 22 and a smaller second diameter 24. Separating the larger diameter 22 and the smaller diameter 24 is a shoulder 26. The cavity 20 may be molded or machined into the valve body 12. The valve body 12 also has a relief line 28 which is connected with a sump of the transmission.

Positioned within the cavity 20 is a movable valve element 30. The movable valve element 30 has a first end or head 32 which is configured to interact with the aperture annual edge portion 16 when the valve element 30 is in its closed operative mode (FIG. 1) so as to prevent fluid flow from the cavity above the separator plate into the cavity 20 provided in the valve body housing and subsequently to the sump via line 28. The head 32 of the valve element as shown is hemispherical. The surface finish on the hemispherical head should be 0.40/0.50 micrometer if made from steel or die cast zinc or magnesium. The head of the valve can also be made of thermoplastic or similar plastic materials. In another embodiment (not shown), the head of the valve element is conical.

The valve body has a valve stem portion 36. The stem portion 36 extends in an axial direction into the cavity 20 away from the aperture edge portion 16. The stem portion has a large diameter area 38. The stem portion has a reduced diameter portion 40 which is provided by an annular cutout or groove. Enlarged from the stem reduced diameter portion 40 is an arrangement of outwardly enlarged annular end 42.

Figure 5:
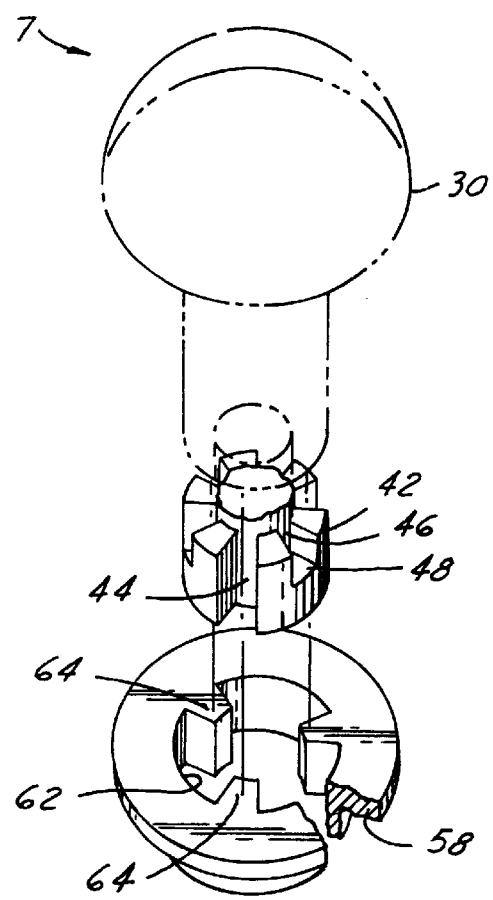
FIG. 5 is an exploded view which further illustrates the base retainer and lower enlarged end of the valve element.

The enlarged annular end 42 of the valve element is best shown in FIG. 5 as three geometrically spaced axially extending keyways 44. The keyways 44 extend the full length of the enlarged annular end 42. The enlarged annular end also has three geometrically spaced axially extending keyways 46 which are formed only partially through the enlarged annular end 42 and have a blind end surface 48.

Figure 2:
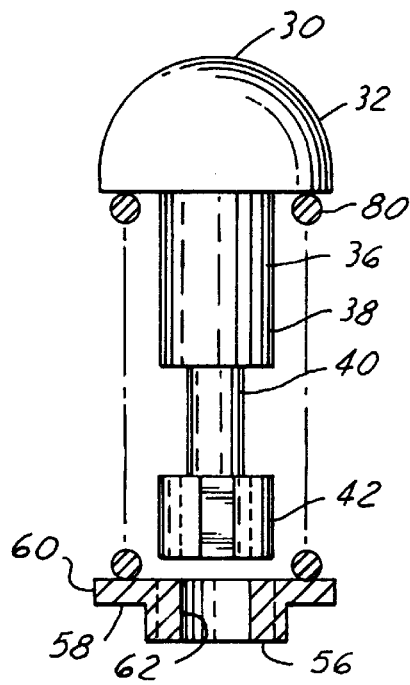
FIG. 2 is a view illustrating an initial step of assembly of a valve element, yieldable member and base retainer.
Figure 3:
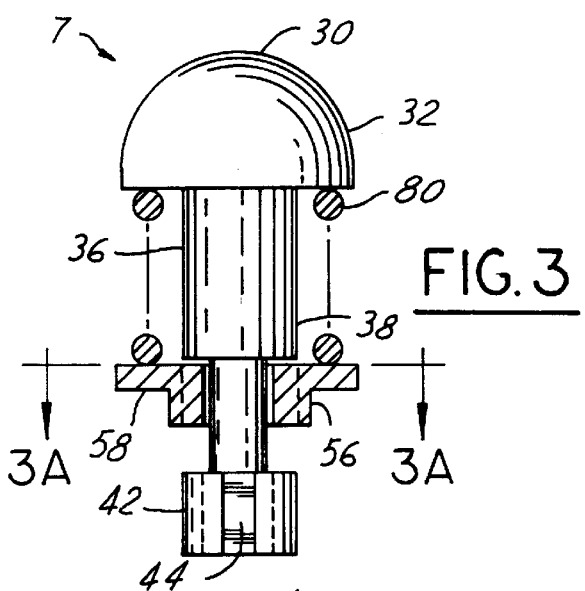
FIG. 3 is a view similar to that of FIG. 2 illustrating insertion of an enlarged end of a valve stem portion into an opening provided in the base retainer.
Figure 3A:
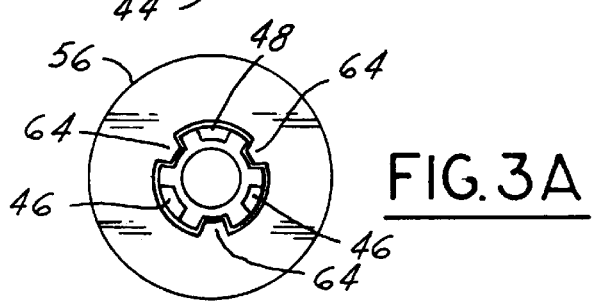
FIG. 3A is a view taken along line 3A-3A of FIG. 3.

The valve assembly 7 additionally has a base retainer 56. The base retainer 56 has a flange portion 58 which abuttedly positions itself upon the cavity shoulder 26. The outer diameter 60 of the base retainer 56 is configured to closely approximate the diameter of the cavity large diameter 22 allowing for a slight clearance for installation. The base retainer 56 has an axially extending central opening 62 therethrough to permit full passage of the enlarged annular end 42 during installation as shown in FIGS. 3 and 2. The base retainer 56 has a formation of three inwardly extending geometrically spaced splines 64.

Captured between the head 32 of the valve element and the flange 58 of the base retainer is a yieldable member provided by a coil spring 80. The coil spring 80 urges the valve element head 32 against the annular edge 16 of the aperture to sealably close the same. In the embodiment shown, the coil spring 80 is manufactured of chrome silicon material with 16 turns of 1 mm. diameter having a spring constant of 38.1 ibf/in. Therefore, typically the check valve assembly 7 will seal against the annular edge portion 16 unless the pressure above the separator plate exceeds 275 psi exerting a force of 12 lbs force upon the valve element.

Figure 4:
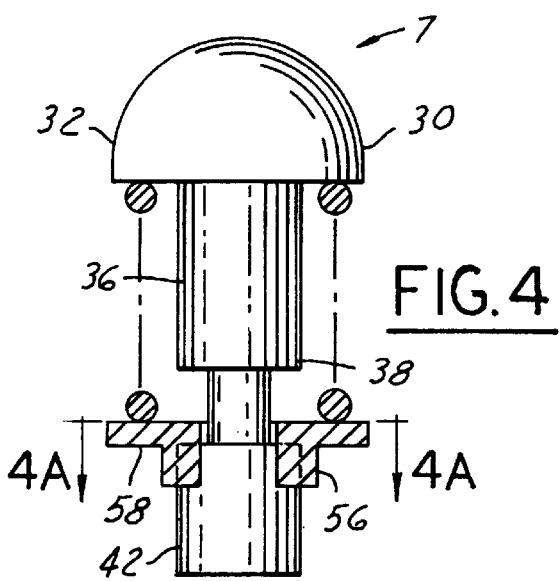
FIG. 4 is a view similar to FIG. 1 illustrating the valve element rotated from the position shown in FIGS. 2 and 3 and in its uppermost position prior to installation in the cavity of the pump housing.
Figure 4A:
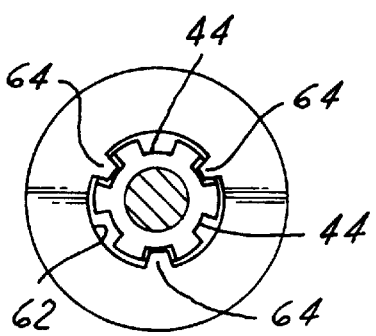
FIG. 4A is a view taken along line 4A-4A of FIG. 4.

To assemble the valve assembly 7 the spring 80 is first encircled about the stem portion 36 (FIG. 2). The base retainer 56 is then utilized to compress the spring 80. As the base retainer 56 compresses the spring 80 (FIG. 3) or simultaneously or slightly before, the splines 64 of the base retainer are aligned with the full axial keyways 44. The enlarged end 42 of the stem portion is inserted through central opening 62 provided in the base retainer (FIGS. 2 and 3). Upon compression of the spring 80 the stem portion 38 is rotated with respect to the base retainer 56 (or vice versa) wherein the splines 64 are aligned with the partial keyways 46 (FIG. 4). The valve element 30, base retainer 56 and spring 80 are then lowered into the elongated cavity 20 until the flange 58 of the base retainer abuts against the shoulder 26 of the cavity. In this position the head 32 will be spring-loaded against the aperture annular edge portion 16 and will be compressed against the same upon the joining of the valve body with the pump body. The depth of the lower diameter portion 26 is such that upon downward movement of the valve body 30 due to pressure forces above the separator plate 10 can only cause the valve body elongated portion 42 to contact the end 27 of the elongated cavity. Therefore, the splines 64 of the retainer cannot escape from being captured within the partial keyways 46 and therefore, the stem portion 38 cannot escape from the base retainer 56.

The valve assembly 7 provides several advantages over prior valve assemblies. The valve assembly 7 can be packaged in a smaller area and has a ball or head 32 with a smaller diameter. The interaction between the base retainer 56 and the elongated end 42 allows the valve assembly 7 to operate in a superior fashion in applications wherein the stem 36 of the valve element 30 is oriented horizontally by laterally supporting the head 32. In a conventional ball check valve which has an aperture which opens horizontally, gravity acting upon the ball can affect the sealing function. A further advantage is that the valve assembly 7 does not have to be encapsulated in a shell to keep the valve assembly 7 together. The valve assembly 7 is easy to use and assemble. Furthermore, it is easy to change the pressure calibration of the valve assembly 7 by a simple change of the spring 80.

While a preferred embodiment of the present invention has been disclosed, it is to be understood that it has been described by way of example only and that various modifications can be made without departing from the spirit and scope of the invention as it is encompassed in the following claims.

We claim:

1. A check valve assembly mounted in an elongated cavity formed in a transmission housing to only permit one-way flow of fluid into the cavity through an aperture located at one end of the cavity, the aperture formed with an annular edge portion thereabout, comprising:

a movable valve element member having a first end configured to interact with the aperture's annular edge portion when said valve element is in its closed operative mode so as to prevent fluid flow therethrough from out of the cavity;

said valve element further having a stem portion extending from said first end in an axial direction of said cavity and away from the aperture's edge portion, said stem portion having an outwardly enlarged annular end configuration;

a base retainer member adapted to be retained within the cavity and having an axially extending central opening therethrough to permit passage of said stem portion including its enlarged annular end configuration;

said central opening in said base retainer member having an inwardly extending spline formation;

said enlarged annular end configuration of said stem portion having an axially extending keyway allowing full passage of the enlarged annular end configuration through the central opening;

said enlarged annular end configuration of said stem portion having an axially extending keyway formed only partially through said annular end configuration permitting alignment with said spline to capture said valve element and said base retainer member together in an axial orientation;

and a yieldable member between said base retainer member and said valve element's first end configuration to urge said first end configuration against the annular edge of the aperture.

2. A check valve assembly as described in claim 1 wherein said first end of said valve element is hemispherical.

3. A check valve assembly as described in claim 1 wherein said valve element stem portion has a mid portion with an annular cutout.

4. A check valve assembly as described in claim 1 wherein said cavity formed in said transmission housing is multi-diametered with a shoulder between a first larger diameter and a second smaller diameter; and said base retainer member has an annular flange which abuts said cavity shoulder.

5. A check valve assembly as described in claim 4 wherein said inwardly extending spline formation of said base retainer extends into said second reduced diameter portion of said cavity.

6. A check valve assembly as described in claim 1 wherein said yieldable member is a coil spring.

7. A check valve assembly as described in claim 1 wherein said base retainer has a plurality of splines.

8. A check valve assembly as described in claim 7 wherein there are three splines.

9. A check valve assembly mounted in an elongated cavity formed in a transmission housing, said cavity having a first larger diameter and a second smaller diameter and a shoulder in between said first and second diameters, said check valve assembly only permitting one-way flow of fluid into the cavity through an aperture located at one end of the cavity, the aperture formed with an annular edge portion thereabout, said check valve assembly comprising:

a movable valve element member having a first hemispherical end configured to interact with the aperture's annular edge portion when said valve element is in its closed operative mode so as to prevent fluid flow therethrough from out of the cavity;

said valve element further having a stem portion extending from said first end in an axial direction of said cavity and away from the aperture's edge portion, said stem portion having an outwardly enlarged annular end configuration;

a base retainer member adapted to be retained within the cavity with a flange to abut said cavity shoulder and said base retainer having an axially extending central opening therethrough to permit passage of said stem portion including its enlarged annular end configuration;

said central opening in said base retainer member having three geometrically spaced inwardly extending splines which extend into said second diameter portion of said cavity;

said enlarged annular end configuration of said stem having three axially extending keyways allowing full passage of the enlarged annular end configuration through the central opening;

said enlarged annular end configuration of said stem having three axially extending keyways formed only partially through said annular end configuration permitting alignment with said splines to capture said valve element and said base retainer member together in an axial orientation;

and a coil spring between said base retainer member and said valve element's first end configuration to urge said first end configuration against the annular edge of the aperture.

* * * * *